Dec. 26, 1939.                W. ERNST                2,184,665
                      SELF CENTERING SERVOMOTOR
              Filed Oct. 21, 1937        3 Sheets-Sheet 1
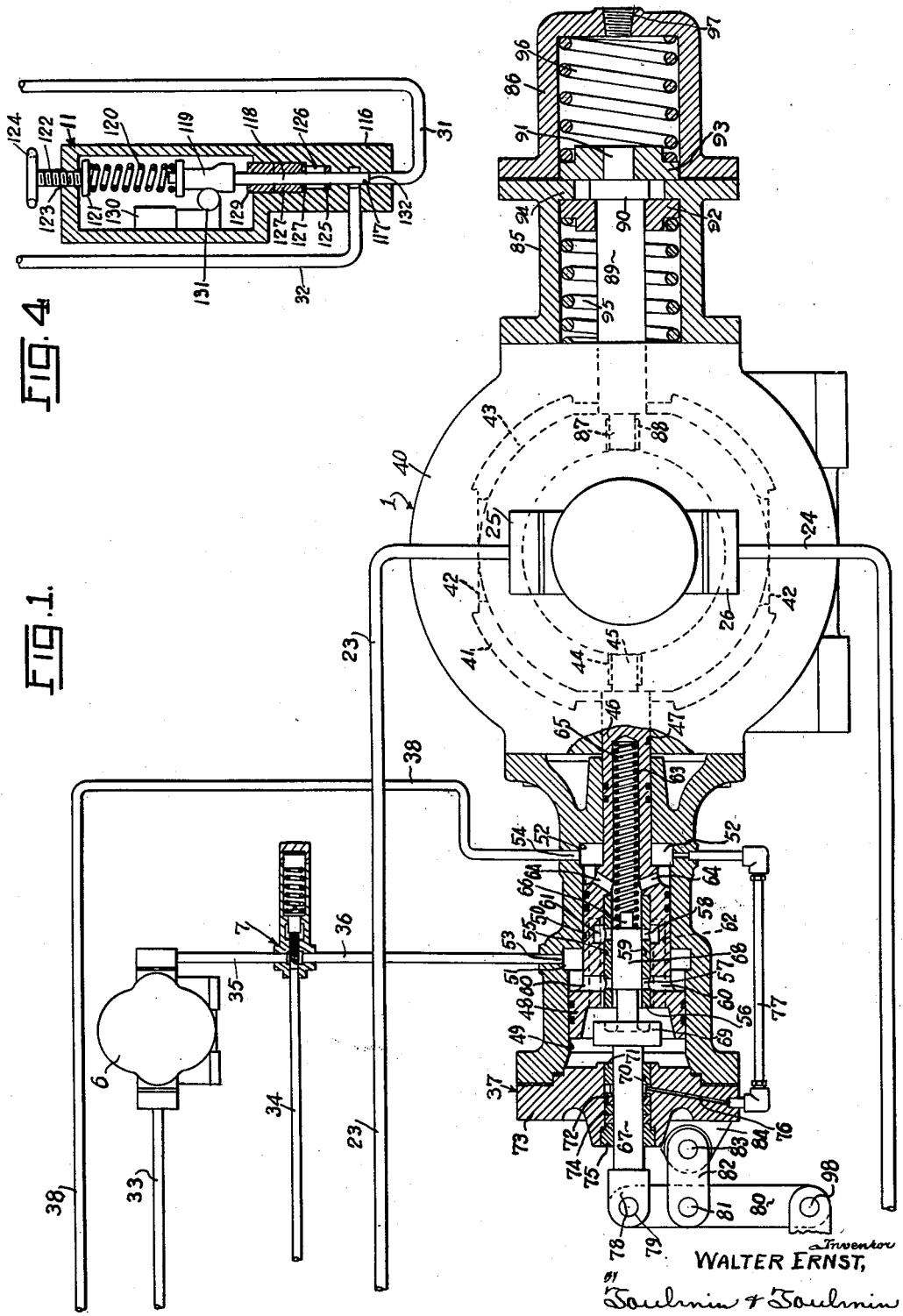
WALTER ERNST,
Toulmin & Toulmin
Attorneys

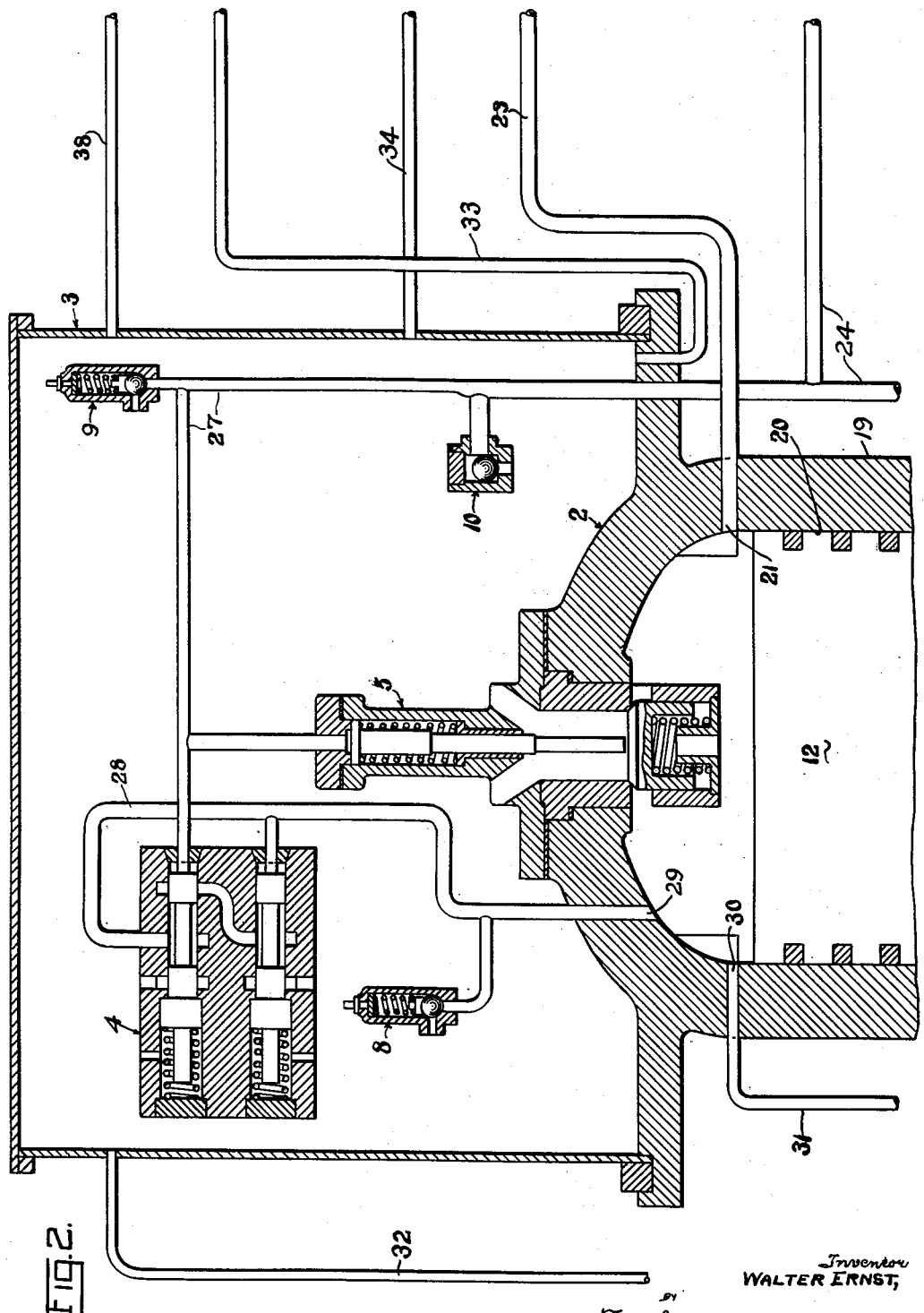

Dec. 26, 1939.   W. ERNST   2,184,665
SELF CENTERING SERVOMOTOR
Filed Oct. 21, 1937   3 Sheets-Sheet 3
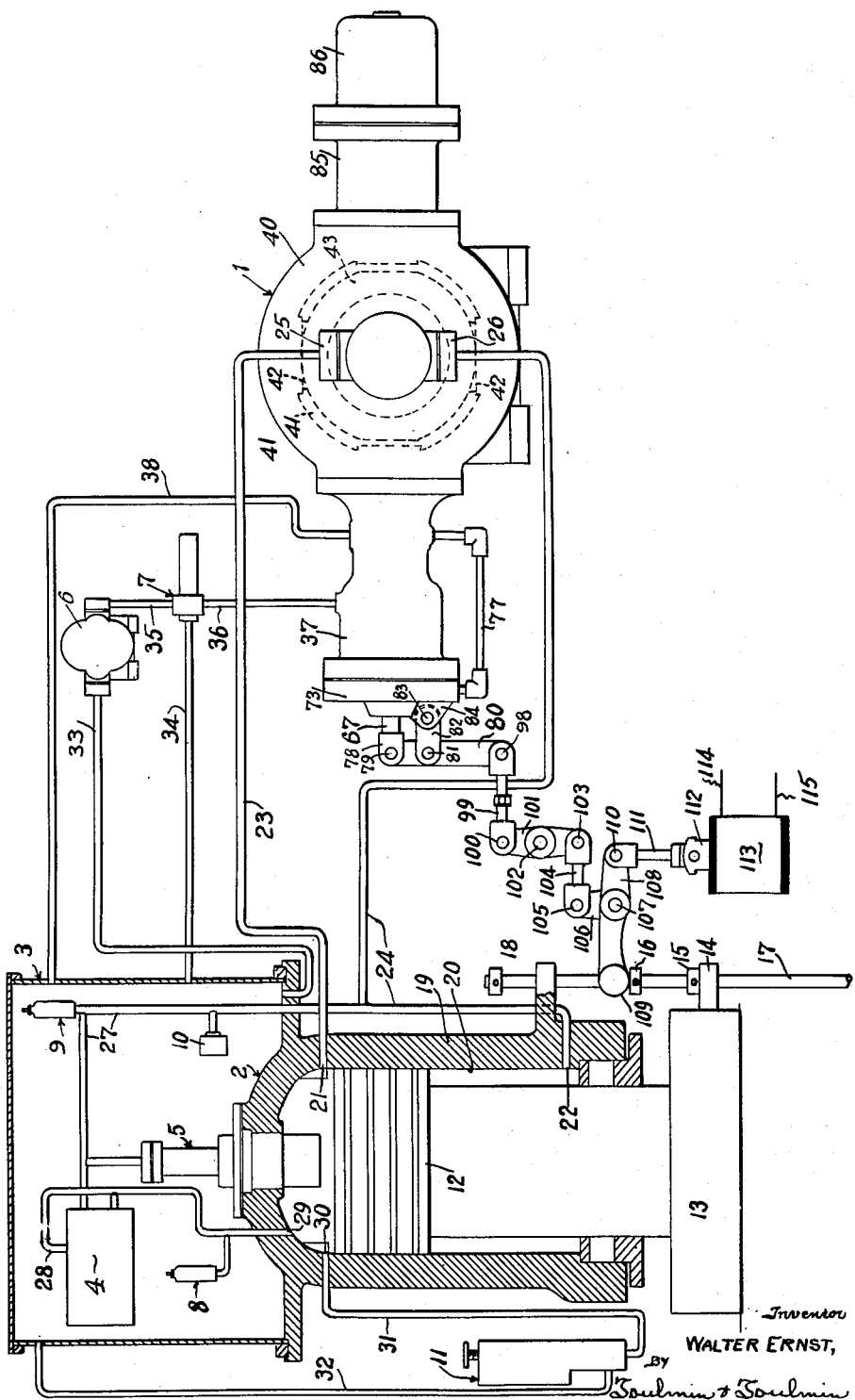

Patented Dec. 26, 1939

2,184,665

UNITED STATES PATENT OFFICE 2,184,665

SELF-CENTERING SERVOMOTOR

Walter Ernst, Mount Gilead, Ohio, assignor to The Hydraulic Press Corp. Inc., Wilmington, Del., a corporation of Delaware Application October 21, 1937, Serial No. 170,250

6 Claims. (Cl. 103—38)

This invention relates to hydraulic machinery, and in particular, to control devices and safety devices for hydraulic pump circuits.

One object of this invention is to provide a hydraulic pump circuit including a control device for attachment to a servomotor-controlled hydraulic pump, and operative to shift the control member thereof to a neutral position in the event of failure of power to the circuit.

Another object is to provide a hydraulic pump and press control circuit including a device which is operative to shift the flow-control member of the pump to a neutral position or no-delivery position when the power connected to the auxiliary pump for supplying fluid to the pump servomotor, or the power for operating the pump itself, is interrupted, thereby preventing the operation of the pump as a motor and the consequent coasting down of the press platen under its own weight.

Another object is to provide a variable delivery hydraulic pump with a flow-control member arranged to be shifted by a servomotor, this servomotor having a control valve with devices associated therewith for shifting the pump flow-control member to its neutral or no-delivery position in the event of failure of the power operating either the servomotor pump or the variable delivery pump itself.

Another object is to provide a variable delivery hydraulic pump with a flow-control member adapted to be shifted by a servomotor controlled by a valve, the servomotor and valve being arranged adjacent each other and amplified by a centering device which becomes operative upon the failure of power to the pump or servomotor to shift the flow-control member of the pump to a neutral position so as to stop the delivery of fluid, and hence, to prevent accidents, such as by the weight of the press platen connected thereto causing its plunger to compress the fluid in the pressing cylinder and cause the pump to act as a motor as a result of the pressure fluid supplied thereto.

Another object is to provide a servomotor control arrangement for a variable delivery pump, wherein the servomotor control valve is located adjacent and preferably within the servomotor piston, thereby eliminating external piping and preventing the locking of the servomotor by the entrapment of fluid therein in the event of a failure of the servomotor pressure fluid supply.

In the drawings:

Figure 1 is a side elevation, partly in longitudinal section, of a variable delivery pump with the automatic centering device, servomotor and control mechanism of this invention, the pump being shown in its neutral or no-delivery position, together with a portion of a press circuit connected thereto.

Figure 2 is a vertical section through the pressing cylinder, a surge tank, a hydraulic tank, together with connections leading to the remainder of the circuit shown in Figure 1.

Figure 3 is a diagrammatic view with the pressing cylinder in vertical section, showing the complete circuit partially shown in Figures 1 and 2.

Figure 4 is an enlarged longitudinal section through the tonnage control valve for regulating the pressing force of the press.

In general, the servomotor control and automatic centering arrangement of this invention consists of a centering rod attached to the flow-control member or shift ring of the variable delivery pump, the opposite side of which carries a servopiston together with a servomotor control valve for regulating the operation of the servopiston. The centering rod is provided with an enlargement engaged on opposite sides by sliding collars, urged thereagainst by springs. In the event that a failure of power occurs, one of these springs will force the rod and consequently the flow-control member or shift ring of the pump, to its neutral position, thereby preventing the compression of the fluid by the weight of the press platen and piston, and consequently preventing the reverse operation of the pump as a motor when receiving this compressed fluid. The arrangement of the servomotor piston and control valve therefor on the same side of the pump shift ring prevents any possible entrapment of fluid, and consequently enables the centering springs to perform their work without being impeded by fluid entrapment.

Hitherto, when variable delivery pumps were used in hydraulic press circuits, a failure of power would terminate delivery of pressure fluid to the main plunger, which would then start to drop by gravity, compressing the fluid beneath it and forcing the pressure fluid thus produced into the pump, causing the latter to act as a motor. Even when the main pump was in a neutral position at the time of the power failure, the pressure of the fluid thus produced by the weight of the platen and pressing plunger has been sufficient to force the pump onto stroke, and then to drive it backward like a motor. The result of such operation was to cause the press platen to coast downwardly at a rapid speed, thereby creating a hazard for the operator, whose hands may be in the press at the moment this occurred. Furthermore, hydraulic failures hitherto have also caused a similar effect by the failure of a relief valve or a hydraulic line, so that the control mechanism failed to operate properly.

Referring to the drawings in detail, Figure 3 shows a hydraulic press circuit containing a variable delivery pump, generally designated 1, arranged to drive a press, generally designated 2, having a fluid or surge tank, generally designated 3. A main cylinder release and by-pass valve, generally designated 4, causes the pressure in the main cylinder of the press to be released at the moment of reversal of the pump 1, and also causes the discharge of the pump 1 to be temporarily by-passed through this valve 4 into the surge tank 3. The construction and operation of this main cylinder release and by-pass valve are shown in the Hubbert Patent No. 2,061,658 (Figure 6), filed November 24, 1936, and described in the specification thereof. The details of this valve 4 form no part of the present invention.

Also shown in the circuit of Figure 3 and more fully shown in the partial circuits of Figures 1 and 2, is a surge valve, generally designated 5, in the top of the main cylinder of the press 2, and serving to admit fluid to the main cylinder during the initial coasting of the main platen, thereby prefilling the main cylinder with fluid until the platen encounters resistance. This surge valve 5 is described in Ernst Patent No. 1,892,568, of December 27, 1932, and its details likewise form no part of the present invention. The surge valve 5, as shown in the above-mentioned patent, is adapted to be forcibly opened upon the return stroke of the press so as to release fluid directly from the main cylinder of the press 2 into the surge tank 3.

The circuit shown in Figure 3 likewise contains a pilot pump, generally designated 6, for delivery of pilot pressure fluid to the servomotor of the variable delivery pump 1. The details of the pilot pump 6 and its driving connection with the variable delivery pump 1 form no part of the present invention and are disclosed in my co-pending application Ser. No. 41,281, filed September 19, 1935. The circuit of Figure 3 also contains a relief valve generally designated 7, connected to the pilot circuit. This relief valve 7 is described in Ernst Patent No. 2,086,295, of July 6, 1937, and its details likewise form no part of the present invention.

Within the surge tank 3 are pressure relief valves 8 and 9, connected on opposite sides of the main cylinder and by-pass valve 4, a check valve 10 being associated with the relief valve 9. The pressure which the press exerts is controlled by a tonnage control valve, generally designated 11, and shown in longitudinal section in Figure 4. The press 2 contains a double-acting main plunger 12 attached to a platen 13, which has an arm 14 adapted to engage a collar 15 upon a control rod 17, the latter being guided by brackets, such as the bracket 18 projecting from the main cylinder 19 of the press 2. The main cylinder 19 contains a bore 20 for the reciprocation of the main plunger 12, and has ports 21 and 22 communicating therewith on opposite sides of the main plunger 12. The ports 21 and 22 are connected respectively to the lines 23 and 24 leading to the forward and return pressure connections 25 and 26 of the variable delivery pump 1. A branch 27 runs from the pipe 24 to the check valve 10, the pressure relief valve 9 and the main cylinder release and by-pass valve 4, the branch 28 continuing from the latter to the port 29 in the main cylinder 19 and containing the pressure relief valve 8. From the port 30 in the main cylinder 19, above the main plunger 12, the line 31 runs to the tonnage control valve 11, from which the line 32 leads to the surge tank 3.

The pilot circuit, including the pilot pump 6 and the pilot pressure relief valve 7, includes the line 33 running from the surge tank 3 to the pilot pump 6, the line 34 serving to convey the fluid discharged by the relief valve 7 back to the surge tank 3, and the lines 35 and 36 for conveying pressure fluid from the pilot pump 6 to the servomotor casing 37 of the variable delivery pump 1. The discharge line 38 leads from the servomotor casing 37 back to the surge tank 3.

The variable delivery pump 1 includes a pump casing 40, having a chamber 41 containing bearing pads 42, supporting and guiding the horizontal reciprocation of the pump shift ring or flow-control member 43. The latter, as is known to those skilled in the art, controls the delivery of the variable delivery pump 1 so as to advance or return the main plunger 12, or to cause it to remain in a neutral position, depending upon the eccentricity of the shift ring 43 from its neutral position. Secured, as at 44, to the shift ring 43 is the threaded end 45 of the servomotor piston rod 46, which passes through the bore 47 in the pump casing 40 and carries at its opposite end the piston head 48. The latter reciprocates within the stepped cylinder bores 49 and 50 in the servomotor casing 37. The bores 49 and 50 are provided with annular enlargements 51 and 52, having ports 53 and 54 to which are connected the lines 36 and 38, respectively.

The piston 48 contains a central longitudinal bore 55, which carries a fixed sleeve 56 having ports 57 and 58 opening into its inner bore 59. The piston 48 likewise is provided with ports 60 communicating with the ports 57, and likewise with an annular enlargement 61 of the bore 55 adjacent the ports 58. The piston 48 is provided with axially bored passageways 62, running from the left-hand side of the piston 48 to the annular enlargement 61, thereby conveying fluid therebetween, but not communicating with the piston ports 60. The piston rod 46 contains a longitudinal bore 63, from which ports 64 communicate with the annular enlargement 52. The piston rod bore 63 is provided with a coil spring 65, one end of which engages the end of the bore 63, and the other end engages the reduced diameter portion 66 of the servomotor control valve rod 67, which carries a valve head 68, movable to and fro within the inner bore 59 of the sleeve 56. The valve rod 67 carries a disc-like baffle member 69 before it enters a bore 70 within a plug 71, carried by a bore 72 in the servomotor cylinder head 73. A packing 74 and gland 75 reduce the fluid leakage around the valve rod 67.

Communicating with the bore 72 in the servomotor cylinder head 73 is a leakage duct 76, which is connected to the enlargement 52 by the leakage pipe 77. The latter serves to carry away any fluid leaking past the plug 71. The outer end of the valve rod 67 is provided with a yoke 78, which is pivoted as at 79 to the upper end of a lever 80. The latter is mounted upon a pivot pin 81, supported by a link 82, pivotally mounted upon a pin 83 supported by the ears 84 upon the servomotor cylinder head 73. Secured to the side of the pump casing 40, opposite the servomotor casing 37, is the centering device casing 85, having a cap 86 mounted upon the opposite side thereof.

Secured to the shift ring 43 of the pump 1, as at 87, is the threaded end 88 of the centering rod 89. The latter is provided with an enlargement 90, beyond which is a reduced portion 91. On opposite sides of the enlargement 90 are collars 92 and 93, slidably mounted upon the centering rod 89 and reduced portion 91 thereof, respectively. The centering device casing 85 is provided with an annular internal flange 94, against which the collars 92 and 93 are urged by coil springs 95 and 96 within the casing 85 and cap 86, respectively. A threaded port 97, normally closed by a plug, permits access to the interior of the cap 86 so as to check the condition of the spring 96.

The lower end of the lever 80 is pivotally connected, as at 98, to a link 99 (Figure 3), which is pivoted at 100 to the upper end of a lever 101. The latter is pivotally mounted upon a fixed pivot 102 and at its lower end is pivoted at 103 to a link 104, pivotally connected at 105 to an arm 106 mounted upon the shaft 107. The latter likewise carries a lever 108, one end of which has a rounded yoke 109 engaging the collar 16 upon the control rod 17. The other end of the lever 108 is pivoted at 110 to a rod 111, connected to the armature 112 of a solenoid 113. The solenoid 113 is energized by electricity reaching it over the wires 114 and 115.

The tonnage control valve 11 (Figure 4) consists of a block 116, containing a longitudinal bore 117 reciprocably receiving a plunger 118, the upper end of which carries a head 119 urged downwardly by the coil spring 120, the upper end of which is engaged by the end 121 of the threaded shaft 122, mounted in the threaded bore 123. A hand wheel 124 serves to adjust the position of the threaded shaft 122, thereby varying the force exerted by the coil spring 120 upon the plunger 118. The plunger 118 carries an annular portion 125 reciprocating in the guide chamber 126, leakage being prevented by the packing consisting of the washer 127, packing 128 and gland 129. A limit switch 130 is positioned with its switch arm 131 adapted to be engaged by the head 119 as it moves upwardly when the plunger 118 is shifted by a predetermined pressure exerted against its lower end 132 by pressure fluid arriving along the line 31, leading to the main cylinder bore 20 above the pressing plunger 12. The limit switch 130 is connected in circuit for energizing the solenoid 113 by way of the wires 114 and 115. The limit switch 130 is normally closed, and thus permits the solenoid 113 to be energized until the plunger 118 of the tonnage control valve 11 rises and opens the switch 130, thereby deenergizing the solenoid 113.

In the operation of the circuit shown in Figures 1 to 3, the solenoid 113 is energized by closing the switch in the usual manner. The energization of the solenoid 113 draws its armature 112 downwardly, this motion being conveyed through the lever 108, arm 106, link 104, lever 101, link 99 and lever 80 to urge the servomotor control valve rod 67 inwardly. This, in turn, compresses the coil spring 65 and shifts the valve head 68 to the right, permitting pressure fluid from the pilot pump 6 and lines 35 and 36 to pass through the ports 60 and 57, into the inner chamber 59 of the sleeve 56, and thence into the cylinder bore 49 to the left of the stepped piston 48. This pressure forces the servomotor piston 48 and piston rod 46 to the right, together with the pump shift ring 43, centering rod 89 and collar 93, thereby compressing the centering spring 96. The motion of the servomotor piston 48 causes a corresponding motion of the sleeve 56 in the same direction, thereby causing the ports 57 to pass over and be closed by the valve head 68. The stroke of the valve head 68, however, is arranged to be slightly greater in each direction than the stroke of the servomotor piston 48 so as to allow a small amount of over-travel. While the piston 48 has been moving to the right the fluid within the annular enlargement 52 is discharged through the port 54 and line 38, into the surge tank 3.

With the pump shift ring 43 shifted to the right of its neutral position in this manner, the pump 1 discharges pressure fluid into the space above the main pressing plunger 12 by way of the line 23 and port 21, thereby forcing the plunger 12 downwardly. Ordinarily, the surge valve 5 opens automatically in response to the gravitational descent of the plunger 12 and admits fluid into the space above the plunger 12 from the surge tank 3 until the platen 13 encounters resistance. When this occurs, the surge valve 5 automatically closes and pressure is built up within the main cylinder bore 20. This pressure is transmitted through the line 31, into the chamber 117, where it acts against the lower end 132 of the plunger 118 of the tonnage control valve 11 (Figure 4).

When this pressure is sufficient to overcome the spring tension in the spring 120, it forces the plunger 118 upwardly, opening the normally closed limit switch 130, and thereby deenergizing the solenoid 113 by breaking its energizing circuit. When the solenoid 113 is deenergized in this manner, the coil spring 65 within the servomotor piston rod 46 forces the servomotor valve rod 67 to the left, causing its head 68 to uncover the ports 58. Fluid then escapes from the left-hand side of the servomotor piston head 48, through the axial passageways 62, into the annular enlargement 61, thence through the ports 58, inner chamber 59 of the sleeve 56, ports 64, annular chamber 52, port 54 and line 38, back to the surge tank 3.

While this is occurring, pressure fluid entering the annular chamber 51 from the pilot pressure line 36 engages the right-hand side of the piston head 48, and urges it to the left, consequently moving to the left the servomotor piston rod 46, the pump shift ring 43, the centering rod 89 and the collar 92, thereby compress'ng the centering spring 95. This action reverses the delivery of the variable delivery pump 1 and causes pressure fluid to pass through the connection 26, line 24 and port 22, into the main cylinder bore 20 beneath the piston head 12, forcing the platen 13 upwardly. This movement continues until the platen arm 14 lifts the collar 15 and the control rod 17. This motion is transmitted through the lever 108, arm 106, link 104, lever 101, link 99 and lever 80 to the servomotor control valve rod 67, forcing the latter inwardly to the right through a partial stroke, thereby moving the shift ring 43 of the pump 1 to its neutral position. The pump 1 thereupon ceases to deliver pressure fluid, and the platen 13 and plunger 12 remain in a retracted position.

If, by a failure of power or other reason, pilot pressure fails to be delivered through the line 36, when the plunger 12 and platen 13 are in their retracted positions, the weight of these moving parts exerted upon the fluid in the circuit generates pressure fluid which momentarily runs the pump 1 backward as a motor, and the pump 1 then runs the pilot pump 6 backward. As the pilot pump 6 runs backward, it sucks the oil out of the line 36 and thus relieves the pressure in the chamber 51. The instant this pressure is relieved, the centering spring 96 shifts the pump flow-control member or shift ring 43 into its neutral position, thereby preventing the pump pistons from reciprocating and therefore preventing the weight of the platen 13 and plunger 12 from creating further pressure fluid to continue to move the pump 1 backwardly as a motor. Thus, a failure of power or other reason for cutting off the flow of pilot pressure fluid through the line 36, permits the platen 13 to coast downwardly but a negligible distance before it halts while the press is in its retracted position. If the press is on its return stroke and the platen 13 is moving upwardly, the pilot valve rod 67 is urged to the left by the coil spring 65 within the servomotor piston rod 46, the stroke of this valve rod 67 being slightly greater than the stroke of the servomotor piston 48 and shift ring 43.

If, now, there is a failure of power or failure of pilot pressure fluid from the line 36 while the press platen 13 is executing a return stroke, the above described action permits the centering spring 95, which is now in a compressed condition, to urge the collar 92 and centering rod 89 to the right, thereby bringing the shift ring 43 of the pump back to its neutral position. Since the servomotor piston 48 and its servomotor cylinder bores 49 and 50 are in constant communication with the pipe lines 36 and 38, respectively, entrapment of fluid therein is prevented in the event that a failure of pilot pressure occurs, such as by a failure of power to the pilot pump 6.

Reference is also made to my copending application, Ser. No. 36,384, filed August 15, 1935, for the disclosure of another type of pump servomotor centering device.

It will be understood that I desire to comprehend within my invention such modifications as come within the scope of the claims and the invention.

Having thus fully described my invention, what I claim as new and desire to secure by Letters Patent, is:

1. In combination in a self-centering servomotor control mechanism for a reversible variable delivery pump with a flow-control member movable in opposite directions from its neutral positions, a servomotor cylinder, a servomotor piston therein connected to said flow-control member, a source of pressure fluid for operating said piston, a control valve adjacent said piston for controlling the supply of pressure fluid from said source to said piston, and yieldingly urged means operatively connected to said flow-control member and arranged to oppose the motion of said flow-control member in either direction of its motion from its neutral position and responsive to a failure of pressure fluid supplied from said source to shift said flow-control member to its neutral position.

2. In combination in a self-centering servomotor control mechanism for a reversible variable delivery pump with a flow-control member movable in opposite directions from its neutral position, a servomotor cylinder, a servomotor piston therein connected to said flow-control member, a source of pressure fluid for operating said piston, a control valve adjacent said piston for controlling the supply of pressure fluid from said source to said piston, and a yieldingly urged device operatively connected to said flow-control member on the opposite side thereof from said servomotor cylinder and arranged to oppose the motion of said flow-control member in either direction of its motion from its neutral position and responsive to the failure of pressure fluid supplied from said source to move said flow-control member to its neutral delivery position.

3. In combination in a self-centering servomotor control mechanism for a reversible variable delivery pump with a flow-control member movable in opposite directions from its neutral position, a servomotor cylinder, a servomotor piston therein connected to said flow-control member, a source of pressure fluid for operating said piston, said piston having a chamber therein with valve ports, a valve member within said chamber cooperating with said ports for controlling the supply of pressure fluid from said source to said piston, and a yieldingly urged device operatively connected to said flow-control member and arranged to oppose the motion of said flow-control member in either direction of its motion from its neutral position and responsive to the failure of pressure fluid supplied from said source to move said flow-control member to its neutral delivery position.

4. In combination in a self-centering servomotor control mechanism for a reversible variable delivery pump with a flow-control member movable in opposite directions from its neutral position, a servomotor cylinder, a servomotor piston therein connected to said flow-control member, a source of pressure fluid for operating said piston, said piston having a chamber therein with valve ports, a valve member within said chamber cooperating with said ports for controlling the supply of pressure fluid from said source to said piston, a pair of springs connected to said flow-control member, one spring being arranged to urge said flow-control member in a direction opposite to that of the other spring from the neutral position of said flow-control member, and means responsive to the failure of pressure fluid supplied from said source for rendering one of said springs inoperative and for rendering the other spring operative to shift said flow-control member to its neutral delivery position.

5. In combination in a self-centering servomotor control mechanism for a reversible variable delivery pump with a flow-control member movable in opposite directions from its neutral position, a servomotor cylinder, a servomotor piston therein connected to said flow-control member, a source of pressure fluid for operating said piston, a control valve adjacent said piston for controlling the supply of pressure fluid from said source to said piston, a rod connected to said flow-control member, a projection on said rod, a spring operatively engaging said projection to urge said rod in one direction from the neutral position of said flow-control member, a second spring operatively engaging said projection to urge said rod in the opposite direction from the neutral position of said flow-control member, and means responsive to the motion of said rod in one direction for disconnecting the spring which normally urges the rod in that direction from operative engagement with said rod while the other spring operatively engages said rod to shift said flow-control member to its neutral delivery position.

6. In combination in a self-centering servomotor control mechanism for a reversible variable delivery pump with a flow-control member movable in opposite directions from its neutral position, a servomotor cylinder, a servomotor piston therein connected to said flow-control member, a source of pressure fluid for operating said piston, a control valve adjacent said piston for controlling the supply of pressure fluid from said source to said piston, a rod connected to said flow-control member, a projection on said rod, a spring operatively engaging said projection to urge said rod in one direction from the neutral position of said flow-control member, a second spring operatively engaging said projection to urge said rod in the opposite direction from the neutral position of said flow control member, and a stop responsive to the motion of said rod in one direction to engage the spring which normally urges the rod in that direction to withdraw its thrust from said projection while the other spring operates to apply a thrust to said projection to shift said flow-control member to its neutral delivery position.

WALTER ERNST.